United States Patent
Toyoda et al.

(10) Patent No.: US 9,430,661 B2
(45) Date of Patent: Aug. 30, 2016

(54) IMAGE FORMING APPARATUS PERFORMING CONTROL OF BROWSING OF A FILE BY A TERMINAL, TERMINAL, FILE BROWSING CONTROL SYSTEM, IMAGE FORMING METHOD, AND RECORDING MEDIUM

(71) Applicant: KYOCERA Document Solutions Inc., Osaka (JP)

(72) Inventors: Takashi Toyoda, Osaka (JP); Tomoki Oyasato, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/292,834

(22) Filed: May 31, 2014

(65) Prior Publication Data
US 2014/0359307 A1 Dec. 4, 2014

(30) Foreign Application Priority Data
May 31, 2013 (JP) ................. 2013-114935

(51) Int. Cl.
*G06F 21/60* (2013.01)

(52) U.S. Cl.
CPC ...... *G06F 21/606* (2013.01); *G06F 2221/2111* (2013.01)

(58) Field of Classification Search
CPC ........ G06F 21/00; G06F 21/10; G06F 21/60; G06F 21/123; G06F 63/107; G06K 15/00
See application file for complete search history.

(56) References Cited

U.S. PATENT DOCUMENTS

2002/0154777 A1 10/2002 Candelore
2007/0269042 A1* 11/2007 Tanaka ............... H04K 1/00
380/44

(Continued)

FOREIGN PATENT DOCUMENTS

JP 2004-297550 A 10/2004
JP 2012-104025 A 5/2012

OTHER PUBLICATIONS

O'Gorman et al., "Secure Identification Documents Via Pattern Recognition and Public-Key Cryptology", IEEE Transaction of Pattern Analysis, vol. 20, No. 10, Oct. 1998.*

(Continued)

*Primary Examiner* — Luu Pham
*Assistant Examiner* — Harvey Cohen
(74) *Attorney, Agent, or Firm* — Hawaii Patent Services; Nathaniel K. Fedde; Kenton N. Fedde

(57) ABSTRACT

There is provided an image forming apparatus that eliminates the need for separately preparing an encrypted file for each user. To achieve this, the image forming apparatus performs control of browsing of a browsing file that is browsed at a terminal. The document acquisition portion of the image forming apparatus acquires document data. The document encryption portion encrypts the document data with a public key as the browsing file. The position information setting portion sets position information to permit browsing of the browsing file encrypted by the document encryption portion in a viewer for causing the browsing file to be browsed at the terminal. In the case where it has been determined that the position information coincides with a current position, a browsing execution portion at the terminal uses a secret key to decrypt the browsing file for causing it to be browsed.

9 Claims, 10 Drawing Sheets

(56) References Cited

U.S. PATENT DOCUMENTS

| | | | |
|---|---|---|---|
| 2008/0013718 A1* | 1/2008 | Okamoto | H04K 1/00 380/30 |
| 2008/0263363 A1* | 10/2008 | Jueneman et al. | 713/184 |
| 2010/0039659 A1* | 2/2010 | Suzuki | 358/1.14 |
| 2010/0067706 A1* | 3/2010 | Anan et al. | 380/285 |
| 2010/0185858 A1* | 7/2010 | Nishimi | H04L 63/08 713/168 |
| 2012/0075669 A1* | 3/2012 | Takiguchi | G06F 3/1204 358/1.15 |
| 2014/0047556 A1* | 2/2014 | Davis | H04L 63/107 726/28 |

OTHER PUBLICATIONS

Karmini et al. "EnhancingSecurityAndConfidentialityIn LocationBasedDataEncryptionAlgorithms", Applications of Digital Information and Web Technologies (ICADIWT), 2011 pp. 30-35.*

Zhang et al., "Secure Files Management System in Intranet", Internet Computing in Science and Engineering, 2008. ICICSE 08, Jan. 28-29, 2008, pp. 306-311.*

* cited by examiner

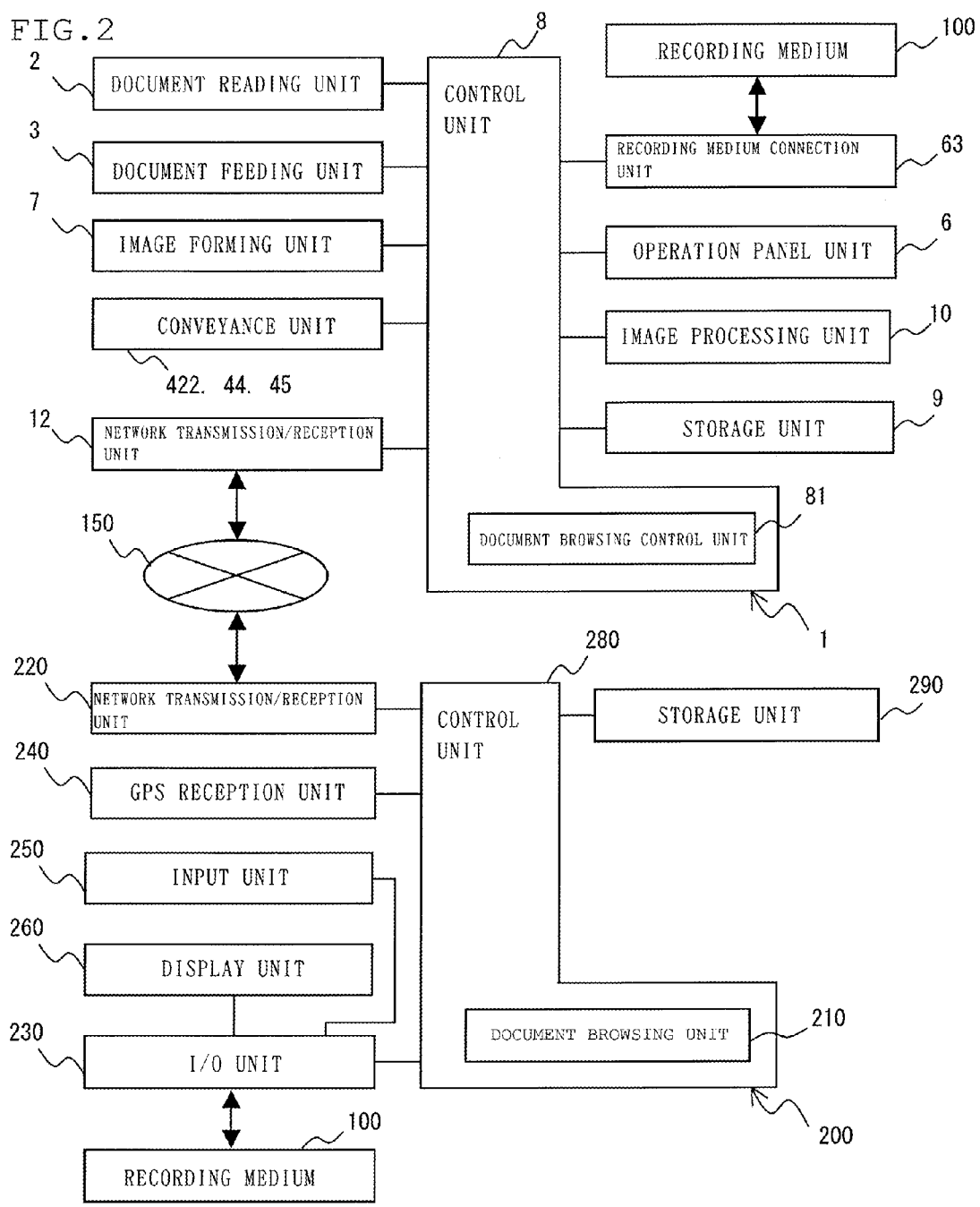

IMAGE FORMING APPARATUS PERFORMING CONTROL OF BROWSING OF A FILE BY A TERMINAL, TERMINAL, FILE BROWSING CONTROL SYSTEM, IMAGE FORMING METHOD, AND RECORDING MEDIUM

INCORPORATION BY REFERENCE

This application is based on and claims the benefit of priority from Japanese Patent Application No. 2013-114935 filed on May 31, 2013, the contents of which are hereby incorporated by reference.

BACKGROUND

The present disclosure relates to an image forming apparatus, a terminal, a file browsing control system, an image forming method, and a recording medium, and particularly to an image forming apparatus, a terminal, a file browsing control system, an image forming method, and a recording medium for causing an encrypted file to be browsed.

A typical image forming apparatus, such as a multifunctional peripheral (MFP), can print a document or an image.

Further, in recent years, there has been available a technique for a file browsing control system that performs control of access to documents, and the like, which have been digitized and accumulated as files. In such a file browsing control system, a dedicated browsing terminal causes a file subjected to encryption, or the like, to be browsed.

In such a file browsing control system, even if there has occurred an outflow or illegal copy of a file, or the like, browsing can be inhibited to make it impossible to display the file, and so on, whereby the security can be enhanced.

SUMMARY

The image forming apparatus of the present disclosure is an image forming apparatus that performs control of browsing of a file with a terminal. An encryption portion encrypts the file with a public key. A browsing permitting position information setting portion sets position information, which is to permit browsing of the file encrypted by the encryption portion, in a viewer for causing the file to be browsed at the terminal.

The terminal of the present disclosure is a terminal for browsing a file encrypted by the image forming apparatus. A position information storage unit stores position information to permit browsing of the file. A position information determination portion determines whether or not the position information stored in the position information storage unit coincide with a current position. Upon the position information determination portion having determined that the position information included in a viewer coincides with a current position, a browsing execution portion uses the viewer stored in the position information storage unit to decrypt the file for causing it to be browsed.

The file browsing control system of the present disclosure is a file browsing control system that performs control of browsing of a file with the image forming apparatus and the terminal. The encryption portion of the image forming apparatus encrypts the file with a public key. The browsing permitting position information setting portion of the image forming apparatus sets position information, which is to permit browsing of the file encrypted by the encryption portion, in a viewer for causing the file to be browsed at the terminal. The position information storage unit of the terminal stores the position information set in the viewer by the browsing permitting position information setting portion. The position information determination portion of the terminal determines whether or not the position information included in the viewer stored in the position information storage unit coincides with a current position. Upon the position information determination portion having determined that the position information included in the viewer coincides with a current position, the browsing execution portion of the terminal uses the viewer stored in the position information storage unit to decrypt the file for causing it to be browsed.

The image forming method of the present disclosure is an image forming method by an image forming apparatus that performs control of browsing of a file with a terminal. With this method, the file is encrypted with a public key, and position information to permit browsing of the file encrypted is set in a viewer for causing the file to be browsed at the terminal.

The recording medium of the present disclosure is a recording medium that is non-transitory and stores a program for implementing an image forming method that is executed by an image forming apparatus that performs control of browsing of a file with a terminal is recorded. The program encrypts the file with a public key, and sets position information to permit browsing of the file encrypted in a viewer for causing the file to be browsed at the terminal.

BRIEF DESCRIPTION OF THE DRAWINGS

FIG. 2 is a block diagram illustrating a control configuration of the image forming apparatus and the terminal according to the embodiment of the present disclosure;

DETAILED DESCRIPTION

<Embodiment>
[Configuration of Image Forming Apparatus 1]

Next, with reference to FIG. 1, a configuration of an image forming apparatus 1 according to an embodiment of the present disclosure will be explained in detail.

Figure 1:
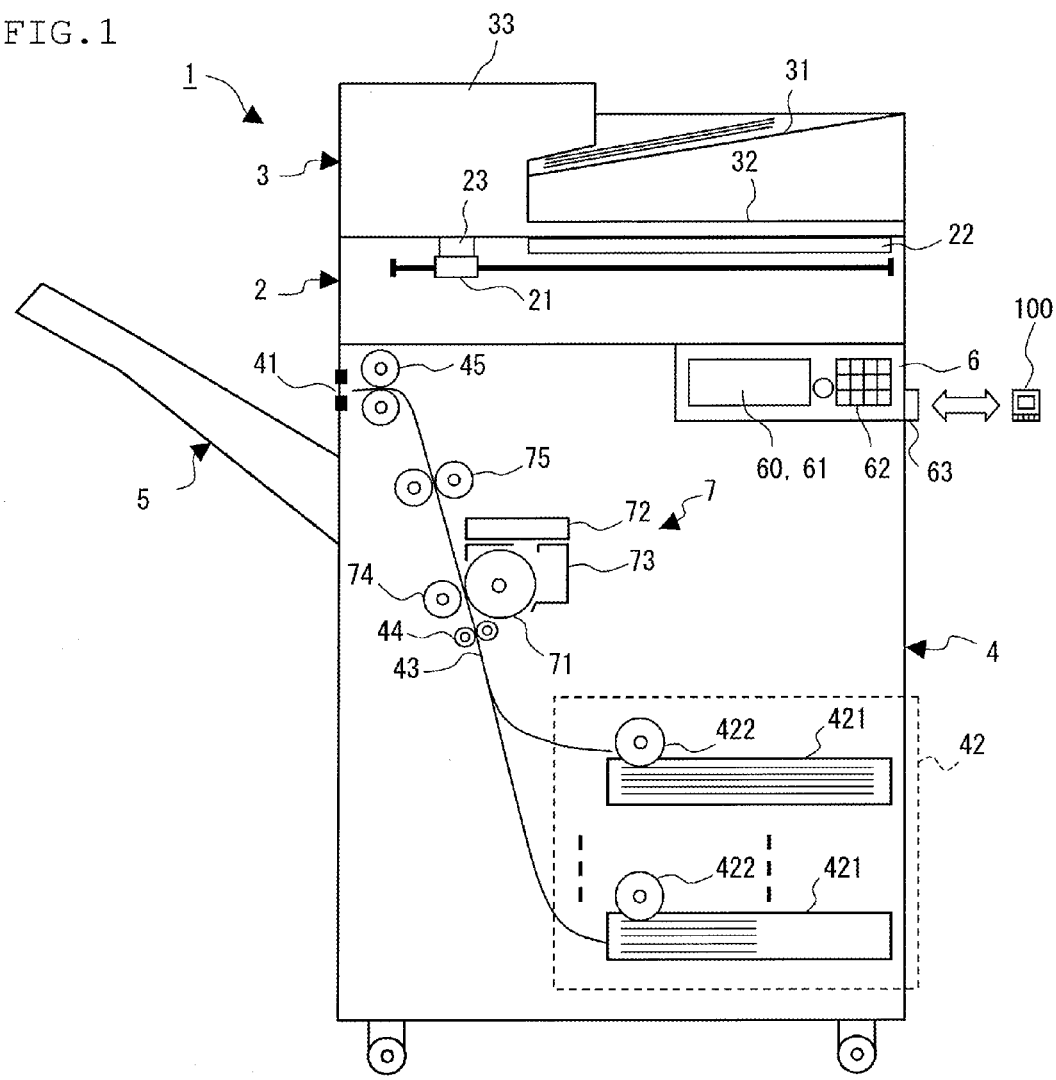
FIG. 1 is a schematic diagram illustrating an internal configuration of an image forming apparatus according to an embodiment of the present disclosure.

Referring to FIG. 1, the image forming apparatus 1 of the present embodiment includes a document reading unit 2, a document feeding unit 3, a main unit 4, a stack tray 5, an operation panel unit 6, and a recording medium connection unit 63.

The document reading unit 2 is disposed on top of the main unit 4, and the document feeding unit 3 is disposed on top of the document reading unit 2. The stack tray 5 is disposed on the side of a delivery port 41 for recording sheets that is formed in the main unit 4, and the operation panel unit 6 is disposed on the front side of the image forming apparatus 1.

The document reading unit 2 includes a scanner 21, a platen glass 22, and a document reading slit 23. The scanner 21 is constituted by an exposure lamp, an imaging sensor, and the like, being configured to be movable in a direction of conveyance of a document by the document feeding unit 3.

The platen glass 22 is a document table formed of a transparent material, such as a glass. The document reading slit 23 has a slit that is formed in a direction orthogonal to the direction of conveyance of a document by the document feeding unit 3.

The document reading unit 2 can automatically recognize the size of a document sheet by sheet, reading an image within the range of that size.

When the scanner 21 is to read a document placed on the platen glass 22, it is moved to a position opposed to the platen glass 22, and reads the document placed on the platen glass 22 while scanning the document for acquiring image data, outputting the acquired image data to the main unit 4.

Further, when the scanner 21 is to read a document carried by the document feeding unit 3, the scanner 21 is moved to a position opposed to the document reading slit 23. And the scanner 21 reads the document through the document reading slit 23 in synchronization with the document carrying operation of the document feeding unit 3 for acquiring image data, outputting the acquired image data to the main unit 4.

The document feeding unit 3 includes a document mounting unit 31, a document discharge unit 32, and a document carrying mechanism 33. The documents placed in the document mounting unit 31 are fed in turn sheet by sheet by the document carrying mechanism 33. The documents are carried to a position opposed to the document reading slit 23, and thereafter are discharged into the document discharge unit 32. The document feeding unit 3 is configured to be tiltable, and by bringing the document feeding unit 3 upward, the top face of the platen glass 22 can be opened.

The main unit 4 includes an image forming unit 7, and also includes a paper feeding unit 42, a paper carrying passage 43, conveyance rollers 44, and discharge rollers 45. The paper feeding unit 42 includes a paper feeding cassette 421, and a feed roller 422. In order to store recording sheets that are different in size or orientation, respectively, there are provided a plurality of paper feeding cassettes 421. The feed roller 422 feeds the recording sheets one by one from the paper feeding cassette 421 to the paper carrying passage 43.

The feed roller 422, the conveyance rollers 44, and the discharge rollers 45 function as a conveyance unit. The recording sheet is conveyed by this conveyance unit. The recording sheet fed by the feed roller 422 into the paper carrying passage 43 is conveyed by the conveyance rollers 44 into the image forming unit 7.

And, the recording sheet provided with a record by the image forming unit 7 is discharged into the stack tray 5 by the discharge rollers 45.

The operation panel unit 6 includes a display unit; a start key; ten keys; buttons for selecting an operation mode, such as copying, facsimile transmission, and scanner; buttons or a touch panel for giving an instruction related to execution of a job, such as printing, transmission, saving, or recording of the selected document, and the like.

The operation panel unit 6 acquires instructions given by the user for various jobs to be made by the image forming apparatus 1. The operation panel unit 6 can also receive or modify a particular user's information in an account setting 90 on the basis of an instruction given by the user to the operation panel unit 6.

The recording medium connection unit 63 is a reader/writer, or the like, which is connected to a recording medium 100. The recording medium connection unit 63 may be connected to the recording medium 100 or a particular piece of equipment by wireless or optical connection, or may be wired-connected thereto with direct contact between terminals. In the case where the recording medium connection unit 63 is to be wired-connected, it includes terminals, connectors, and the like, for performing reading and writing the recording medium 100.

Further, the recording medium connection unit 63 controls access to the recording medium 100, and controls communications with another terminal.

The recording medium 100 connected to the recording medium connection unit 63 functions in the same manner as a storage unit 9 (see FIG. 2).

The recording medium 100 is a particular piece of equipment, or the like, incorporating a recording medium.

The recording medium 100 stores image data scanned by the image forming apparatus 1, or another terminal (not shown), information for use in user authentication, and the like, and other document data, and the like.

Further, the recording medium 100 is also capable of storing a viewer 97 (FIGS. 3A and 3B) in which a browsing file 96, a secret key 191, and position information 192 are set, as described later.

The image forming unit 7 includes a photosensitive drum 71, an exposure unit 72, a developing unit 73, a transfer unit 74, and a fixing unit 75.

The exposure unit 72 is an optical unit, and exposes the photosensitive drum 71 to form an electrostatic latent image on the surface of the photosensitive drum 71 on the basis of the image data.

The developing unit 73 is a developing unit that uses toner for developing the electrostatic latent image formed on the photosensitive drum 71, and causes a toner image to be formed on the photosensitive drum 71 on the basis of the electrostatic latent image. The transfer unit 74 causes the toner image formed on the photosensitive drum 71 by the developing unit 73 to be transferred onto the recording sheet. The fixing unit 75 causes the toner image to be fixed on the recording sheet by heating the recording sheet onto which the toner image has been transferred by the transfer unit 74.

[Configuration of File Browsing Control System]

In FIG. 2, there is given a block diagram illustrating a schematic control configuration of a file browsing control system that uses the image forming apparatus 1 and a terminal 200 to perform control of browsing a file.

{Configuration of Image Forming Apparatus 1}

In the image forming apparatus 1, the document reading unit 2, the document feeding unit 3, the conveyance unit (the feed roller 422, the conveyance rollers 44, and the discharge rollers 45), the operation panel unit 6, and the image forming unit 7 of the image forming apparatus 1 are connected to the control unit 8 to be operation-controlled by the control unit 8. Further, to the control unit 8, a storage unit 9, an image processing unit 10, a network transmission/reception unit 12, and the like, are connected.

The control unit 8 is an information processing unit. The control unit 8 and the image processing unit 10 read a control program stored, and by executing this control program, performs control of the entire apparatus in response to predetermined instruction information inputted from the operation panel unit 6.

Further, the control unit 8 includes a document browsing control unit 81 (an encryption portion, a browsing permitting position information setting portion, and a secret key setting portion). The document browsing control unit 81 is implemented by the control unit 8 executing a program stored in the storage unit 9. The details of the function configuration of the document browsing control unit 81 will be described later.

The storage unit 9 is a storage unit that uses a recording medium that is non-transitory. The storage unit 9 stores image data that has been scanned by the document reading unit 2; image data that has been image-processed by the image processing unit 10; print document data that has been transmitted from the user's terminal; various files that have been read from the recording medium 100; thumbnail image data; a control program for performing operation control of the image forming apparatus 1, and the like. The storage unit 9 may contain an area for a saving folder for each user. The details of data to be stored in the storage unit 9 will be described later.

The image processing unit 10 is a control arithmetic unit for image processes. The image processing unit 10 performs various image processes, such as enlargement/reduction process, density adjustment, gradation adjustment, and image improvement process.

The image processing unit 10 converts an image read by the document reading unit 2 to data, such as a file, before storing it in the storage unit 9 as document data 95.

The network transmission/reception unit 12 is a network connection device for connecting the image forming apparatus 1 to a network 150.

The network transmission/reception unit 12 transmits/receives data with a data communication channel, while transmitting/receiving an audio signal with an audio telephone line.

Further, the image forming apparatus 1 is connected to the terminal 200 through the network transmission/reception unit 12. The image forming apparatus 1 and the terminal 200 constitutes a file browsing control system.

In the image forming apparatus 1, the control unit 8 and the image processing unit 10 may be integrally formed like a CPU containing GPU, or the like, or a chip-on-module package.

Further, the image forming apparatus 1 may include a facsimile transmission/reception unit for performing facsimile transmission/reception.

Further, the control unit 8 may store a control program for performing operation control of the image forming apparatus 1 in an ROM, or the like.

{Configuration of Terminal 200}

The terminal 200 includes a network transmission/reception unit 220, an I/O unit 230, a GPS reception unit 240 (a current position acquisition unit), an input unit 250, a display unit 260, a control unit 280, a storage unit 290 (a position information storage unit and a viewer storage unit).

The network transmission/reception unit 220 is a transmission/reception device for connecting the terminal 200 to the network 150. The terminal 200 is capable of transmitting/receiving a document data 95 (FIG. 3), a browsing file 96, a viewer 97, a user ID or password for login, and the like, through the network transmission/reception unit 220.

The network transmission/reception unit 220 may be connected to an external hub or router, or the like, and therethrough connected to the network 150.

The I/O unit 230 is a constitutional portion that provides an interface for connection to various pieces of peripheral equipment. The I/O unit 230 is connected to the input unit 250 and the display unit 260.

Further, like the recording medium connection unit 63 in the image forming apparatus 1, the I/O unit 230 is capable of connecting the recording medium 100 for reading and writing data.

The GPS reception unit 240 is a position information acquisition unit that includes a receiver and an antenna for the GPS (Global Positioning System), a gyro sensor, and the like. The GPS reception unit 240 may acquire a signal, such as a GPS repeater, in addition to various GPS signals. Further, the GPS reception unit 240 may acquire a positional signal by a radio wave of a portable network, or the like.

The GPS reception unit 240 is capable of calculating a current position of the terminal 200, using such a signal received, the address on the network, and the like.

The input unit 250 inputs information, such as various settings, and user authentication.

The display unit 260 is capable of making a screen display for drawing for an application, security setting, and the like.

The control unit 280 is a device having an arithmetic/control capability. The control unit 280 executes each program stored in the storage unit 290, using a hardware resource.

Further, the control unit 280 includes a document browsing unit 210 (a position information determination portion, and a browsing execution portion). The detailed configuration of the document browsing unit 210 will be described later. The document browsing unit 210 is implemented by the control unit 280 executing a program stored in the storage unit 290.

The storage unit 290 is a storage device. The storage unit 290 stores various programs and document data for browsing for causing the terminal 200 to function as a terminal for document browsing. The details of these programs and data will be described later.

Further, the storage unit 290 also stores an OS (Operating System) including a GUI (Graphical User Interface), various application softwares (hereinafter to be called applications), other programs and data, and the like. These programs and data can be read for execution, and written by the control unit 280. In other words, the storage unit 290 can also once store printing data prepared by the document browsing unit 210. The terminal 200 can also transmit this printing data to the image forming apparatus 1 as the document data 95.

{Details of Function Configurations and Data of Image Forming Apparatus 1 and Terminal 200}

Here, with reference to FIG. 3A and FIG. 3B, the details of the function configurations and data of the image forming apparatus 1 and the terminal 200 will be explained.

The image forming apparatus 1 and the terminal 200 encrypt the document data 95 with a public key 190 to prepare a browsing file 96 such that it cannot be browsed in an ordinary manner.

In order to browse this browsing file 96, the terminal 200 must be execute a dedicated viewer 97. The viewer 97 includes a secret key 191 for decrypting the browsing file 96 that has been encrypted by the public key 190.

Figure 3A:
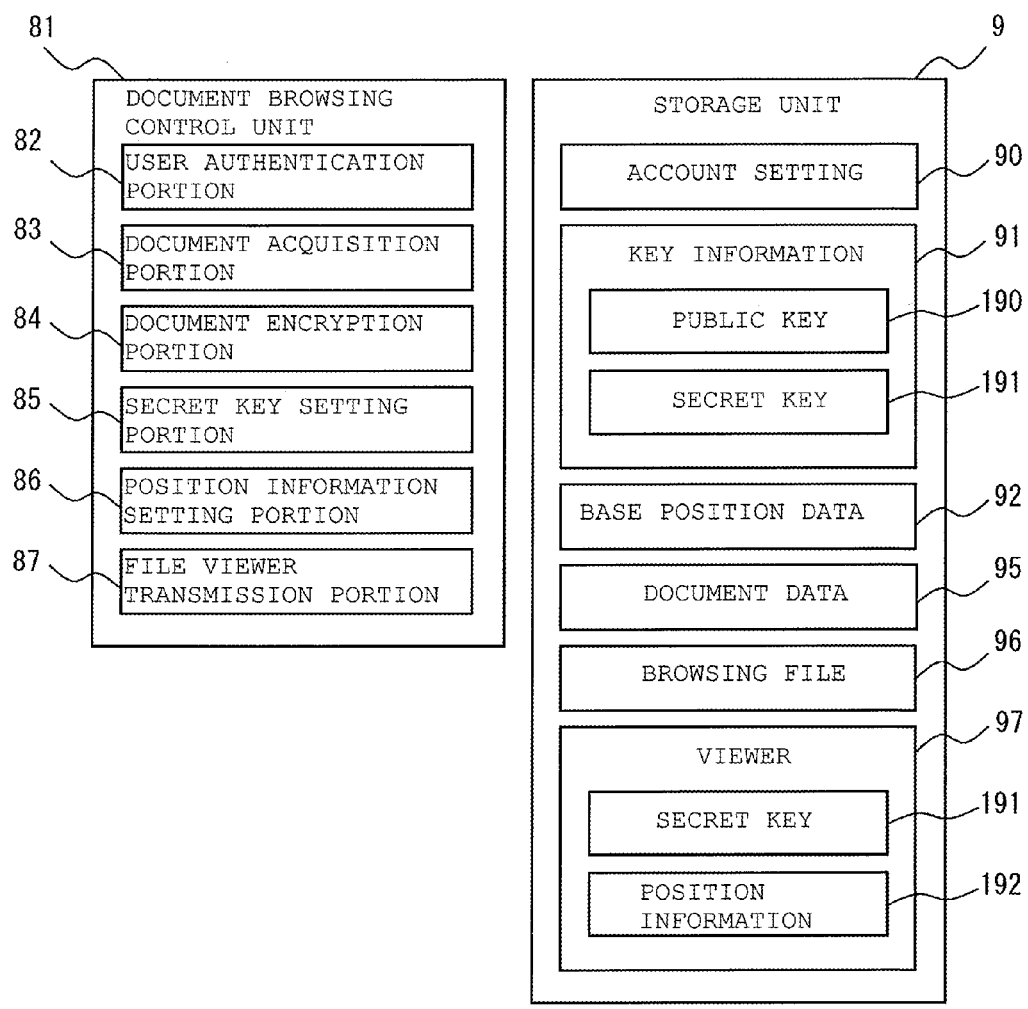
FIG. 3A is a block diagram illustrating the details of the functional configuration and data of the image forming apparatus according to the embodiment of the present disclosure.
Figure 3B:
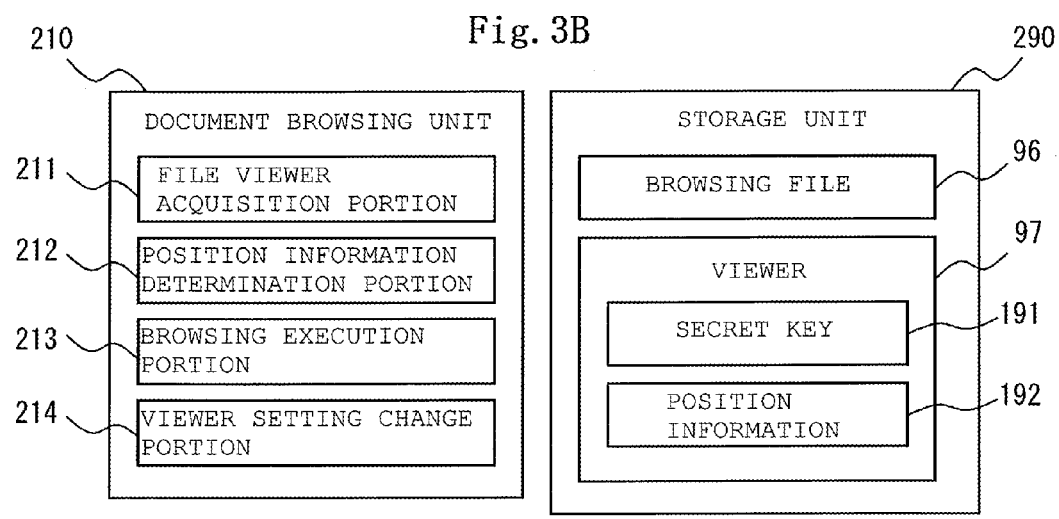
FIG. 3B is a block diagram illustrating the details of the functional configuration and data of the terminal according to the embodiment of the present disclosure.

FIG. 3A and FIG. 3B show a configuration of the image forming apparatus 1 and the terminal 200 after the browsing file 96 and the set viewer 97 having been transmitted by the later described process to the terminal 200.

Referring to FIG. 3A, the document browsing control unit 81 in the control unit 8 of the image forming apparatus 1 includes a user authentication portion 82, a document acquisition portion 83, a document encryption portion 84 (an encryption portion), a secret key setting portion 85, a position information setting portion 86 (a browsing permitting position information setting portion), and a file viewer transmission portion 87 (a file transmission portion and a viewer transmission portion). Further, the storage unit 9 of the image forming apparatus 1 stores the account setting 90, the key information 91 (the public key 190 and the secret key 191), the base position data 92 (position information), the document data 95, the browsing file 96, and the viewer 97.

Referring to FIG. 3B, the document browsing unit 210 of the terminal 200 includes a file viewer acquisition portion 211 (a file acquisition portion and a viewer acquisition portion), a position information determination portion 212 (a position information determination portion), a browsing execution portion 213 (a browsing execution portion), and a viewer setting change portion 214 (a viewer setting change portion). Further, the storage unit 290 (the viewer storage unit) of the terminal 200 stores the browsing file 96 and the viewer 97 that have been acquired from the image forming apparatus 1. The viewer 97 may be separately installed in the terminal 200.

(Configuration of Document Browsing Control Unit 81)

The user authentication portion 82 references the account setting 90 for performing user authentication. The user authentication portion 82 receives the user ID and the password inputted from the operation panel unit 6 or the terminal 200, and reads the account setting 90 for performing comparison and authentication.

The document acquisition portion 83 saves the image data read by the document reading unit 2 in the storage unit 9 as the document data 95. Further, the document acquisition portion 83 may prepare the document data 95 from the printing data, and the like, transmitted from the terminal 200 or another terminal (not shown). Further, the document acquisition portion 83 may acquire the document data 95 from the recording medium 100, the terminal 200, the user saving folder (not shown) in the storage unit 9, and the like, to store it in the storage unit 9.

The document encryption portion 84 encrypts the document data 95 with the public key 190 included in the key information 91 to prepare the browsing file 96. Since the document data 95 is encrypted with the public key 190, this public key 190 may be transmitted to the terminal 200 or another terminal, a server, or the like, (not shown), for encrypting it in such a piece of equipment.

The secret key setting portion 85 sets the secret key 191 for decrypting the browsing file 96 in the viewer 97 stored in the storage unit 9. This secret key 191 is also included in the key information 91.

The position information setting portion 86 sets the position information 192, which is to permit browsing of the browsing file 96 encrypted by the document encryption portion 84, in the viewer 97. The position information 192 is set on the basis of the base position data 92.

The file viewer transmission portion 87 transmits prepared browsing file 96 and the viewer 97 in which the secret key 191 and the position information 192 are set, to the terminal 200, or writes them to the recording medium 100.

(Configuration of Storage Unit 9)

The account setting 90 is a database including attribute information, such as the user ID (the user name), the password, the authority information, the IP address of the terminal 200, and the mail address, for each user account. The user ID and the password in the account setting 90 are used for login to the image forming apparatus 1. The authority information in the account setting 90 includes information about authority of handling, such as printing, transmission or browsing, of a highly confidential, browsing-controlled document, in other words, information about the type of a "general user" or "authorized user". The account setting 90 is registered with the use of various pieces of information that are inputted by the user from the operation panel unit 6 or the terminal 200.

The key information 91 includes the public key 190 for encrypting the browsing file 96, and the secret key 191 for decrypting the browsing file 96. For each user, a separate piece of key information 91 may be included. Further, the key information 91 may be acquired from the terminal 200. Further, the key information 91 may be prepared on the basis of the user password, or the like, in the account setting 90. Further, the key information 91 may include data, such as the installation location (the position) of the image forming apparatus 1, and the manufacturing number and ID thereof.

The base position data 92 includes the position where the image forming apparatus 1 is installed, the position where to permit browsing of the browsing file 96 for respective user authorities, and the like. On the basis of this base position data 92, the position information 192 is set in the viewer 97.

The document data 95 is data of the document acquired by the document acquisition portion 83. The document data 95 includes character data, image data, and other types of data. The document data 95 may be image data that has been read by the document reading unit 2 and subjected to image process by the image processing unit 10. In addition, the document data 95 may be data that has already been converted into a prescribed format by the image processing unit 10 or the control unit 8. Further, the document data 95 may be data prepared by reading map or document data, image data, or the like, stored in the recording medium 100 that has been brought about by the user and connected to the recording medium connection unit 63.

The browsing file 96 is a file of the document data 95 that has been prepared, being encrypted by the document encryption portion 84. The browsing file 96 is decrypted by the viewer 97 in the terminal 200 to be provided for browsing.

The viewer 97 is a file viewer program, or the like, for allowing the browsing file 96 to be browsed with the terminal 200. In the present embodiment, the viewer 97 is transmitted from the image forming apparatus 1 to the terminal 200, stored in the storage unit 290 of the terminal 200, and executed by the browsing execution portion 213 of the document browsing unit 210 of the terminal 200. The viewer 97 may be configured so as to be executable also in the image forming apparatus 1. Further, the viewer 97 may be installed by causing the terminal 200 to read the recording medium. Even in this case, the secret key 191 and the position information 192 are set with the image forming apparatus 1.

The public key 190 and the secret key 191 provide a public key/secret key pair, or the like, for encoding (encrypting) and decrypting with a hash function, or the like.

The position information 192 is data including the coordinate data, such as the latitude or longitude that is acquirable with a GPS, the altitude, or the like; the positional data that is acquirable with a portable telephone network; and the positional information, such as the address data, the name of the area or that of the building, and the IP address of the image forming apparatus 1 on the network. In the position information 192, a plurality of base positions where to permit browsing can be set with the allowable range in which browsing is possible even away from such a position being able to be specified as a value of from a several ten meters to a several hundred meters, or a value like a subnet mask on the network of an IP address, respectively. The position information 192 may also include setting information, such as the permissible time of browsing by the viewer 97, the number of permissible times of browsing, the permissible date of browsing, and the deadline of browsing, for each position.

(Configuration of Document Browsing Unit 210)

The file viewer acquisition portion 211 acquires the browsing file 96 and the viewer 97 transmitted by the file viewer transmission portion 87, and stores them in the storage unit 290. Further, the file viewer acquisition portion 211 is also capable of acquiring the browsing file 96 and the viewer 97 that are recorded in the recording medium 100, and storing or installing them into the storage unit 290.

The position information determination portion 212 determines whether or not the position information 192 included in the viewer 97 stored in the storage unit 290 coincides with a current position acquired from the GPS reception unit 240. At this time, the position information determination portion 212 determines whether or not the current position is a position within a prescribed allowable range in the position information 192.

In the case where the position information determination portion 212 has determined that the position information 192 included in the viewer 97 coincides with the current position, the browsing execution portion 213 uses the secret key 191 included in the viewer 97 stored in the storage unit 290 to decrypt the browsing file 96 for causing it to be browsed.

[Browsing File Preparation Process by Image Forming Apparatus 1]

Figure 4:
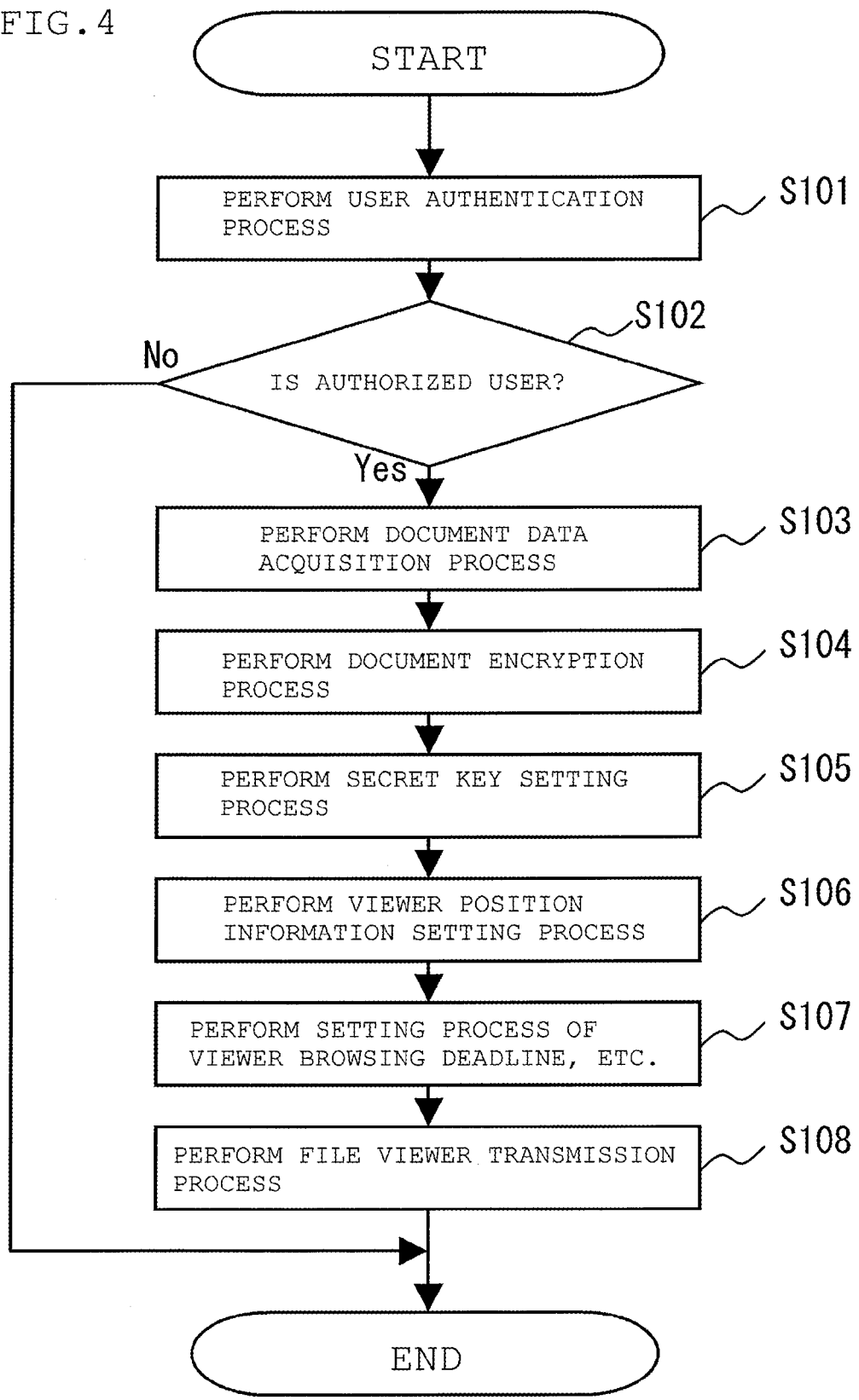
FIG. 4 is a flowchart of browsing file preparation process according to the embodiment of the present disclosure.

Here, with reference to FIG. 4 and FIG. 5, the browsing file preparation process with the image forming apparatus 1 according to the embodiment of the present disclosure will be explained.

In the browsing file preparation process, the document data 95 is encrypted mainly with the image forming apparatus 1 to prepare the browsing file 96. Thereafter, the secret key 191 and the position information 192 are set in the viewer 97 for this browsing file 96 to be transmitted to the terminal 200.

In this browsing file preparation process, mainly the control unit 8 executes the program stored in the storage unit 9 in cooperation with each unit, using the hardware resource.

Hereinbelow, with reference to a flow chart in FIG. 4, the outline of the browsing file preparation process will be explained for each step.

(Step S101)

First, the document browsing control unit 81 uses the user authentication portion 82 to perform user authentication process.

The document browsing control unit 81 receives an instruction for preparing a file browsable with the viewer 97 from the operation panel unit 6. Then, the document browsing control unit 81 displays a dialog for requesting inputting of the user ID and the password, and the like, on the display unit of the operation panel unit 6. Upon the ID and the password being acquired, the document browsing control unit 81 reads the account setting 90 for comparison.

The document browsing control unit 81 may perform authentication by means of the recording medium 100, such as an IC card in which the user ID information is stored, a biometric authentication sensor (not shown), or the like.

Further, the document browsing control unit 81 may cause the display unit 260 of the terminal 200 to display a dialog, or the like. Thereby, the document browsing control unit 81 may acquire the ID or password from the user through the network 150 for performing authentication.

(Step S102)

Next, the document browsing control unit 81 uses the user authentication portion 82 to determine whether the user concerned is an authorized user. In the case where the user ID and the password coincide with those stored in the account setting 90, the document browsing control unit 81 reads the authority information in the account setting 90 for the user that has been acquired. And, in the case where the user concerned is an authorized user, the document browsing control unit 81 makes a determination of Yes. In any other cases, the document browsing control unit 81 makes a determination of No.

If Yes is given, document browsing control unit 81 advances the process to Step S103.

If No is given, the document browsing control unit 81 gives a display, such as "You have no permission for preparing a file to be browsed with viewer", on the display unit of the operation panel unit 6, or the like, to terminate the browsing file preparation process.

(Step S103)

In the case where the user who has been authenticated is an authorized user, the document browsing control unit 81 uses the document acquisition portion 83 to perform document data acquisition process.

The document browsing control unit 81 causes the document reading unit 2 to read a document set by the user, for example, and saves the image data of the read document in the storage unit 9 as the document data 95.

Further, the document browsing control unit 81 may acquire PDL (Page Description Language) data, or the like, from the terminal 200 or another terminal (not shown), and prepare the document data 95 to save it in the storage unit 9. This PDL data is prepared by application software that is executed by the terminal 200 or another terminal, or the like, and transmitted by the device driver in the image forming apparatus 1.

Further, the document browsing control unit 81 may acquire the document data 95 that already exists in the recording medium 100 connected to the recording medium connection unit 63 or the user saving folder (not shown) in the storage unit 9, or the like, and store it in the storage unit 9. Further, the document acquisition portion 83 may acquire the document data 95 that already exists, from the saving folder (not shown) in the terminal 200 or another terminal, and store it in the storage unit 9.

The document browsing control unit 81 may acquire the document data 95 from another image forming apparatus 1 or another server (not shown) through the network 150. Further, the document browsing control unit 81 may acquire a document, or the like, received by facsimile as the document data 95.

(Step S104)

Next, the document browsing control unit 81 uses the document encryption portion 84 to perform document encryption process.

Figure 5:
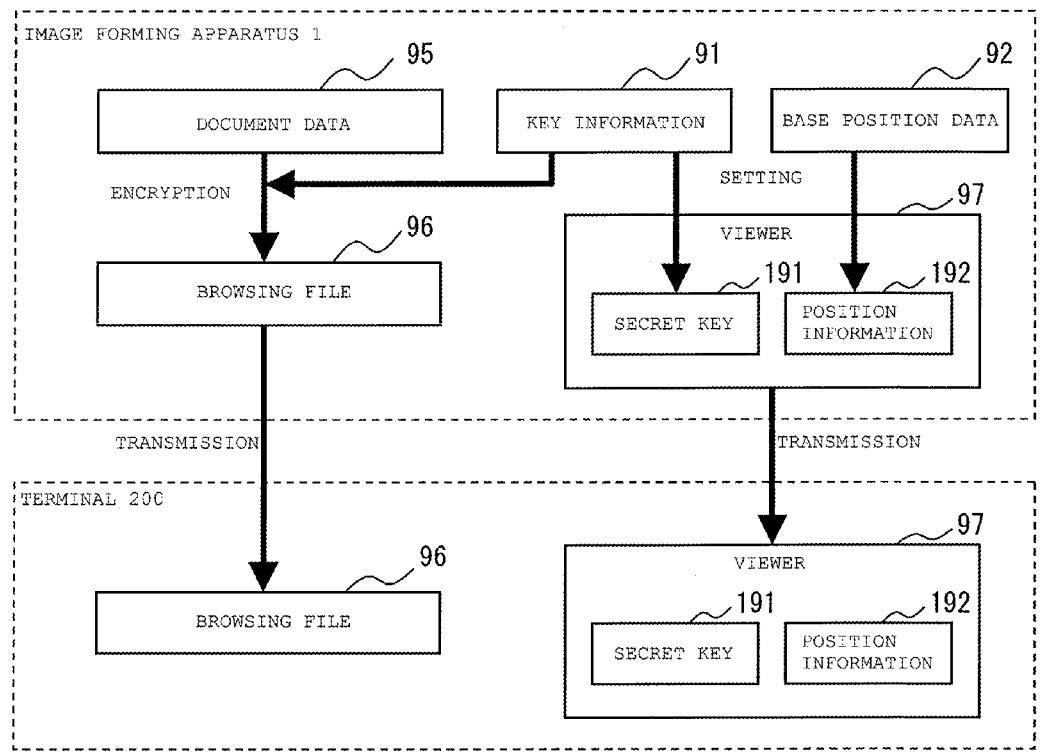
FIG. 5 is a conceptual drawing illustrating the relationship among the respective files resulting from the browsing file preparation process according to the embodiment of the present disclosure.

Referring to FIG. 5, the document browsing control unit 81 encrypts the document data 95 stored in the storage unit 9 with the public key 190 in the key information 91, using a hash function, or the like.

The document browsing control unit 81 stores the encrypted document data 95 in the storage unit 9 as the browsing file 96. At this time, in the present embodiment, the position information 192 is not caused to be included in the browsing file 96 itself.

(Step S105)

Next, the document browsing control unit 81 uses the secret key setting portion 85 to perform secret key setting process.

The document browsing control unit 81 sets the secret key 191 included in the key information 91 in the viewer 97 stored in the storage unit 9. In the case where the viewer 97 is executed at the terminal 200, this secret key 191 can be used to decrypt the browsing file 96.

(Step S106)

Next, the document browsing control unit 81 uses the position information setting portion 86 to perform viewer position information setting process.

The document browsing control unit 81 sets the position information 192 in the viewer 97 on the basis of the user setting and the base position data 92. The document browsing control unit 81 sets the position information 192 about the base (location or position) where to permit the user to browse the browsing file 96 encrypted by the document encryption portion 84.

The document browsing control unit 81 specifies the allowable range of, for example, a several ten meters to a several hundred meters in radius out of the base position data 92 for the position where the image forming apparatus 1 is installed, or the like, and sets it in the viewer 97 as the position information 192. Further, in indoors where the position cannot be acquired by means of the GPS, the document browsing control unit 81 may specify the allowable range on the basis of the radio wave information from the portable telephone network, and set it in the viewer 97 as the position information 192. Further, the document browsing control unit 81 may set, in the viewer 97, a subnet mask on the network, or the position information 192 about the allowable range, such as that to permit browsing in the case where the current position is in the same LAN as the image forming apparatus 1.

Further, the document browsing control unit 81 is capable of setting a plurality of positions where to permit browsing of the browsing file 96. The document browsing control unit 81 is capable of setting a plurality of base positions, such as "headquarter", "branch A", and "branch B", in the viewer 97 as the position information 192. The document browsing control unit 81 is also capable of setting the secret key 191 such that it varies for each of the plurality of base positions.

Further, the document browsing control unit 81 is capable of setting an allowable range in accordance with the type of the viewer 97 or the authority of the user caused to browse in the viewer 97 as the position information 192. At this time, a plurality of viewers 97 may be prepared for setting the position information 192 and the secret key 191 in the respective viewers 97.

For example, the document browsing control unit 81 can make such settings:

Viewer 97 for cooperative company: Browsable only at specific base

Viewer 97 for general partner: Browsable at any bases

Viewer 97 for senior management employee: Browsable at any location

Further, as the position information 192, the document browsing control unit 81 is capable of setting such position information that can be specified by using a specific key word, or the like, such as "inside Shinkansen" or "National High Way Route No. - - - ".

In this way, by setting the position information 192 and the secret key 191 in the viewer 97, the browsing location for the browsing file 96 can be flexibly set.

(Step S107)

Next, the document browsing control unit 81 uses the position information setting portion 86 to perform setting process of viewer browsing deadline, etc.

The document browsing control unit 81 is capable of setting the permissible time of browsing in the viewer 97 for each position. In other words, the document browsing control unit 81 can be set such that, in a prescribed location, after the viewer 97 having been started at the terminal 200, browsing of the browsing file 96 is permitted only for a browsing time that has been set.

Further, the document browsing control unit 81 may set the number of permissible times of browsing in the viewer 97. In other words, the document browsing control unit 81 can be set such that, at the terminal 200, the viewer 97 can be started by the number of permissible times of browsing. Likewise, the document browsing control unit 81 may set the permissible date of browsing, the deadline of browsing, or the like. In other words, the document browsing control unit 81 can be set such that, if the terminal 200 is in a particular position, and the browsing time of day or period is not the permitted one for that position, the viewer 97 cannot be started.

The document browsing control unit 81 can set the browsing time, the number of permissible times of browsing, the permissible date of browsing, the deadline of browsing, and the like, including these in the position information 192.

As described later, the document browsing control unit 81 allows the settings of the secret key 191 and the viewer 97 to be changed from the operation panel unit 6 or the terminal 200.

(Step S108)

Next, the document browsing control unit 81 uses the file viewer transmission portion 87 to perform file viewer transmission process.

The document browsing control unit 81 transmits the viewer 97 in which the position information 192 and the secret key 191 are set, and the browsing file 96 to the terminal 200. The document browsing unit 210 in the terminal 200 acquires these by means of the file viewer acquisition portion 211, and stores them in the storage unit 290.

Further, the document browsing control unit 81 is capable of writing the viewer 97 and the browsing file 96 to the recording medium 100 connected to the recording medium connection unit 63 to store them therein. The file viewer acquisition portion 211 in the terminal 200 can also acquire the viewer 97 and the browsing file 96 stored in the recording medium 100.

By the above way, the browsing file preparation process according to the embodiment of the present disclosure is terminated.

[File Browsing Process by Terminal 200]

Next, with reference to FIG. 6 to FIG. 9, the details of file browsing process by the terminal 200 will be explained.

By the above browsing file preparation process, the terminal 200 acquires the encrypted browsing file 96 and the viewer 97 from the image forming apparatus 1, and stores them in the storage unit 290. In the viewer 97, there are set the secret key 191 and the position information 192 for decrypting the browsing file 96.

With the file browsing process of the present embodiment, if the user instructs the viewer 97 to start in this state, the following process will be performed.

This file browsing process is performed mainly by the control unit 280 executing the program stored in the storage unit 290 in cooperation with each unit, using the hardware resource.

Figure 6:
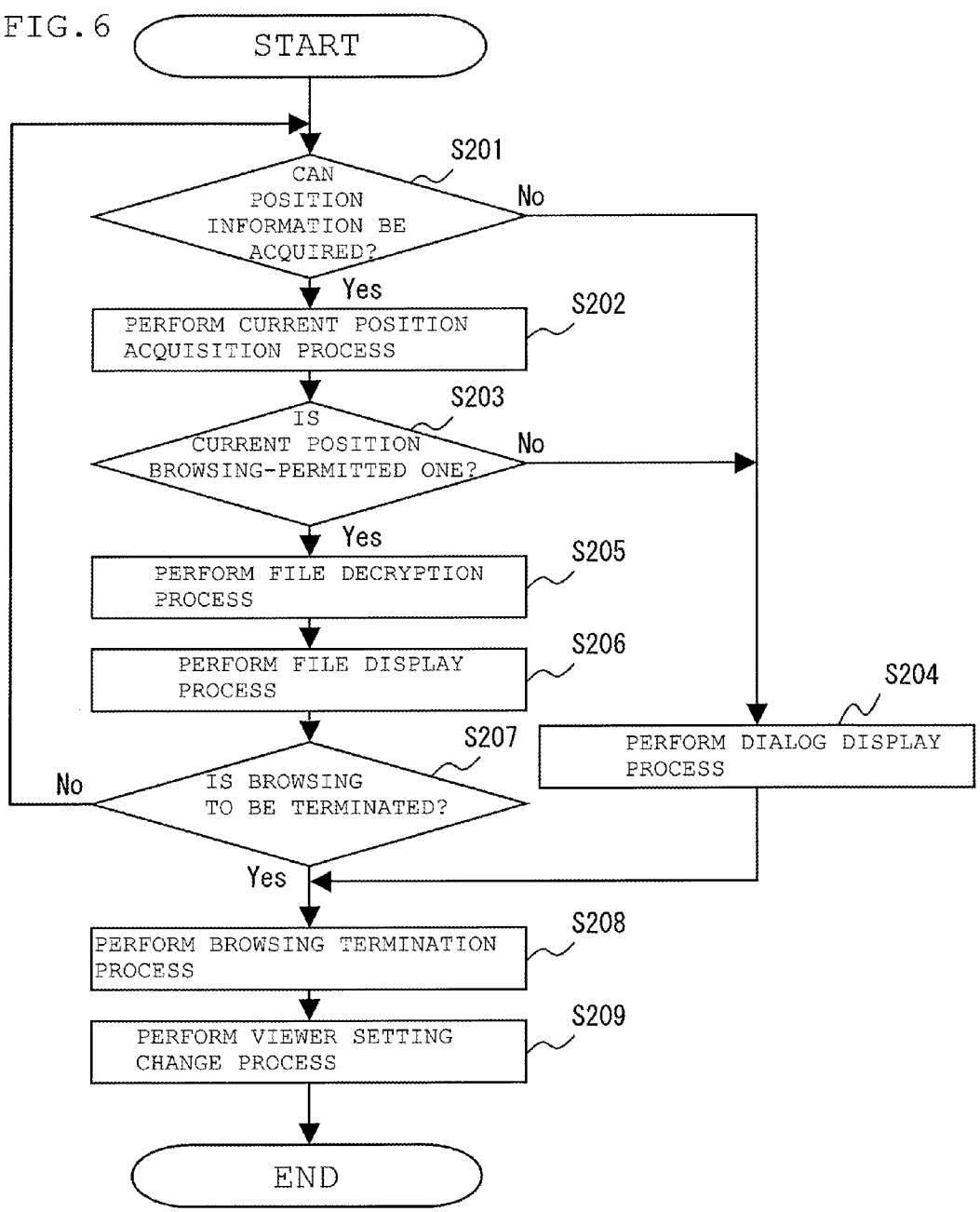
FIG. 6 is a flowchart of file browsing process according to the embodiment of the present disclosure.

Hereinbelow, with reference to a flowchart in FIG. 6, the file browsing process will be explained in detail for each step.

(Step S201)

First, the document browsing unit 210 uses the position information determination portion 212 to determine whether or not the position information can be acquired. In the case where the GPS reception unit 240 (FIG. 2) in the terminal 200 can be used, and the current position can be acquired, the document browsing unit 210 makes a determination of Yes. In any other cases, the document browsing unit 210 makes a determination of No. Further, in the case where, in the viewer 97, the number of permissible times of browsing, the deadline of browsing, the permissible time of day of browsing, and the like, are set, and these browsing conditions are not met, the document browsing unit 210 makes a determination of No. In other words, in such a case as that where the number of times of browsing exceeds the permissible value, or the browsing time of day or period is not the permitted one, the document browsing unit 210 makes a determination of No. Further, also in the case where, in the first place, neither the secret key 191 nor the position information 192 is set in the viewer 97, the document browsing unit 210 makes a determination of No.

If Yes is given, the document browsing unit 210 advances the process to Step S202.

If No is given, the document browsing unit 210 advances the process to Step S204.

(Step S202)

Next, the document browsing unit 210 uses the position information determination portion 212 to perform current position acquisition process.

In this process, the document browsing unit 210 acquires the current position of the terminal 200 by means of the GPS reception unit 240.

The document browsing unit 210 may calculate the latitude and longitude of the terminal 200 from a plurality of GPS satellites, or may use information of the base station of the portable telephone network, or the like, to identify the current position. Further, the document browsing unit 210 may identify the current position from the radio wave of the GPS repeater, or the like. In addition, the document browsing unit 210 may identify the indoor current position from the magnitude of the radio wave from an access point of a wireless LAN, or the like. Further, the document browsing unit 210 may use the value of a gyro sensor or atmospheric pressure sensor (not shown) for identifying the current position more accurately.

Further, the document browsing unit 210 may identify the position on the network in a specific LAN, or the like. At this time, the document browsing unit 210 may specify the information of whether or not the image forming apparatus 1 is on the same LAN as the terminal 200 as the current position. The document browsing unit 210 may make broadcasting, or the like, to communicate with the image forming apparatus 1 for referencing the manufacturing number, the ID, and the like, in the key information 91, and the installation position, and the like, included in the base position data 92 to identify the current position.

The document browsing unit 210 may cause the user to make the login to the terminal 200, or the like, to check for whether or not the user is the same one who is expected to use the viewer 97.

(Step S203)

Next, the document browsing unit 210 uses the position information determination portion 212 to determine whether or not the browsing location coincides with the permitted one. The document browsing unit 210 determines whether or not the position information 192 included in the viewer 97 stored in the storage unit 290 coincides with the current position acquired from the GPS reception unit 240. At this time, in the case where the current position acquired is a position within the allowable range of the position information 192, the document browsing unit 210 gives a determination of coincidence. In the case where the current position acquired is a position within the allowable range of the position information 192, the document browsing unit 210 makes a determination of Yes. In any other cases, the document browsing unit 210 makes a determination of No.

If Yes is given, the document browsing unit 210 advances the process to Step S205.

If No is given, the document browsing unit 210 advances the process to Step S204.

(Step S204)

In such a case as that where the current position has not been acquired, the current position does not coincide with the browsing permitted location, or any other browsing condition is not met, the document browsing unit 210 uses the position information determination portion 212 to perform dialog display process.

Figure 7:
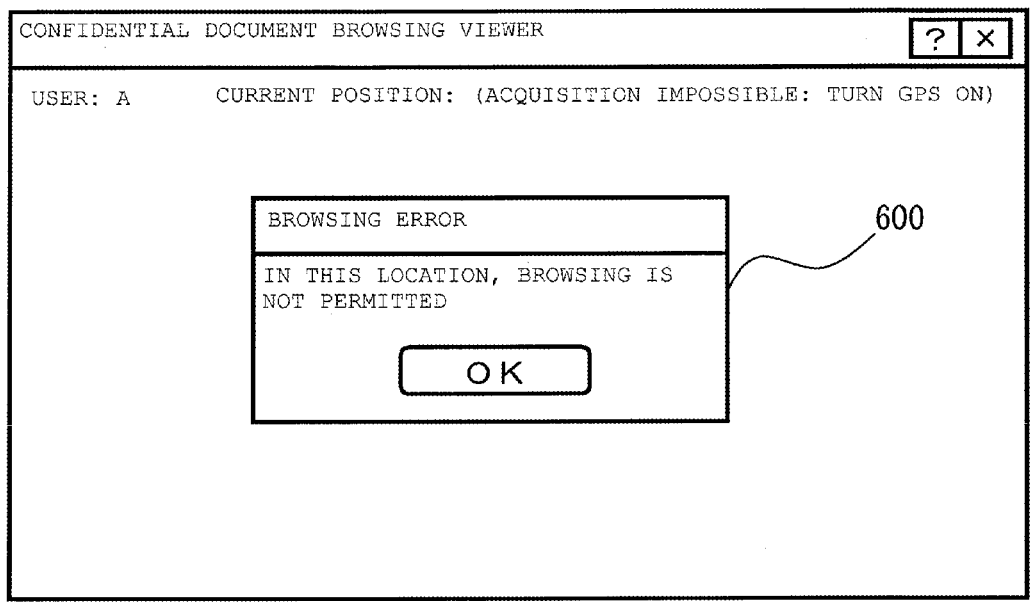
FIG. 7 is an example of screen for dialog display process according to the embodiment of the present disclosure.

Referring to FIG. 7, for example, in the case where the GPS function is off, the document browsing unit 210 may give such a display of "Turn GPS on" as in a display example 500 to notify the user of the situation. Further, in the case where the current position does not coincide with the browsing permitted location, the document browsing unit 210 may display a dialog box giving a message "Position information error: In this location, browsing is impossible", or the like, as in a display column 600. Further, also in the case where any other browsing condition is not met, or neither the secret key 191 nor the position information 192 is set, the document browsing unit 210 may give a display of that effect.

Thereafter, the document browsing unit 210 advances the process to Step S208.

(Step S205)

In the case where the current position coincides with the browsing permitted location, the document browsing unit 210 uses the browsing execution portion 213 to perform file decryption process.

Figure 8:
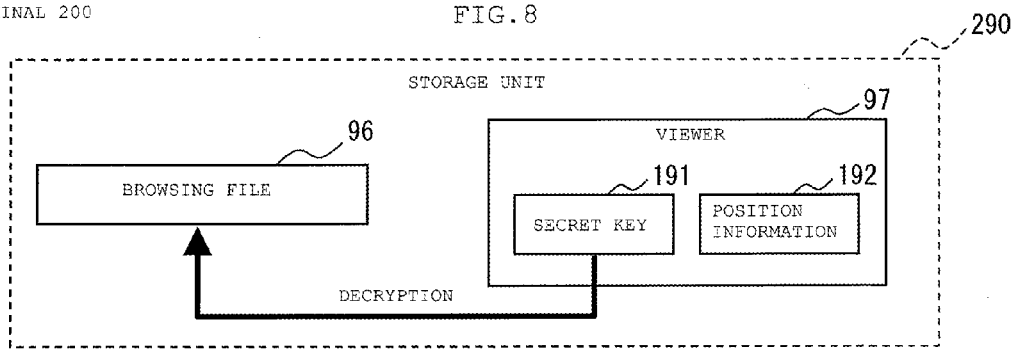
FIG. 8 is a conceptual drawing for file decryption process according to the embodiment of the present disclosure.

With reference to FIG. 8, the file decryption process will be explained. The document browsing unit 210 decrypts the browsing file 96 by means of the secret key 191 included in the viewer 97 stored in the storage unit 290.

At this time, the document browsing unit 210 can successively read and decrypt only the part of the browsing file 96 that has been displayed in the display unit 260 of the terminal 200.

Further, the document browsing unit 210 may save the decrypted data of the browsing file 96 in the protected storage area of the storage unit 290. Thereby, only the viewer 97 can read the decrypted data.

(Step S206)

Next, the document browsing unit 210 uses the browsing execution portion 213 to perform file display process.

Figure 9:
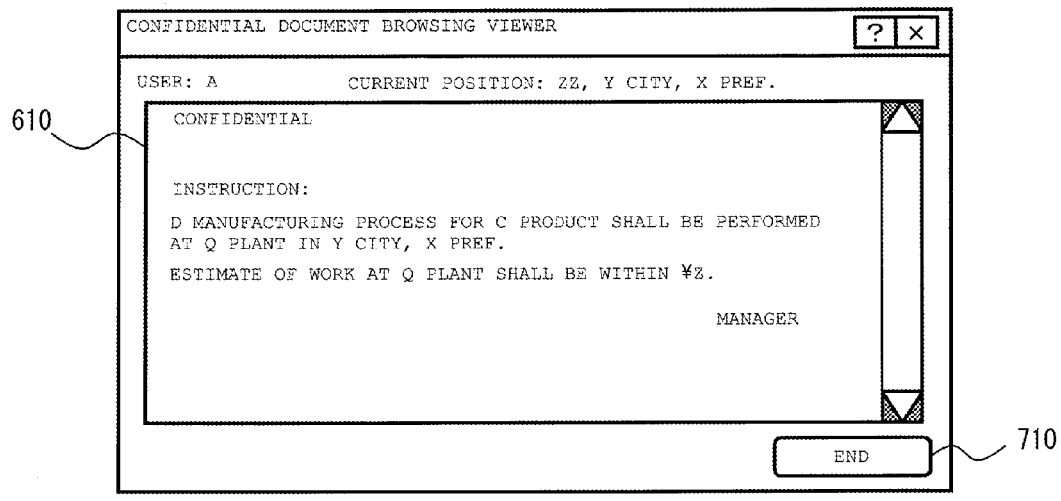
FIG. 9 is an example of screen for file display process according to the embodiment of the present disclosure.

Referring to FIG. 9, such a window as a display column 610 is displayed in a screen, such as that in a display example 501, for displaying the decrypted data of the browsing file 96. At this time, in the case where the browsing file 96 is to be successively decrypted, the document browsing unit 210 acquires the user's instruction at the input unit 250, and successively reads the browsing file 96 for display in response to the user depressing the scroll bar, or the like.

The document browsing unit 210 may perform printing, facsimile-transmitting, saving in the recording medium 100, file-transmitting, or the like, of the decrypted data of the browsing file 96 at the image forming apparatus 1.

Further, the document browsing unit 210 may transmit that the user is making browsing to the image forming apparatus 1 in order to cause it to monitor the situation.

(Step S207)

Next, the document browsing unit 210 uses the browsing execution portion 213 to determine whether or not an instruction for terminating the browsing has been given by the user. In such a case as that where the user has depressed a "terminate" button 710 in FIG. 9, has selected a choice of "terminate" from the file menu (not shown) for the viewer 97, or has depressed a button for closing the window of the viewer 97, the document browsing unit 210 makes a determination of Yes. Further, also in the case where a browsing permissible time has been set, and the browsing permissible time has elapsed from the start of the viewer 97, the document browsing unit 210 makes a determination of Yes. In any other case, the document browsing unit 210 makes a determination of No.

If Yes is given, the document browsing unit 210 advances the process to Step S208.

If No is given, the document browsing unit 210 waits for a predetermined time period, and then returns the process to Step S201 to make the user to continue the browsing. This allows a process scheme that, during browsing of a document, the current position of the terminal 200 is acquired at fixed intervals of time, and when the terminal 200 comes out of the area in which the browsing file 96 can be decrypted, the browsing file 96 that is currently being browsed is closed.

(Step S208)

In the case where an instruction for terminating the browsing has been given by the user, the current position could not have been acquired, or the current position of the terminal 200 has been shifted to a position where browsing is not permitted, the document browsing unit 210 uses the browsing execution portion 213 to perform browsing termination process.

Then, the document browsing unit 210 closes the window of the viewer 97, and makes the other necessary operations. Thereafter, the document browsing unit 210 deletes the decrypted data of the browsing file 96. At this time, the document browsing unit 210 may transmit that the browsing has been terminated, to the image forming apparatus 1.

Further, in such a case as that where the number of permissible times of browsing has been set, and the number of starts of the viewer 97 has exceeded the number of permissible times of browsing, or where the deadline of browsing has been exceeded, the document browsing unit 210 may delete the secret key 191 or the viewer 97 itself from the storage unit 290 such that the viewer 97 cannot be started.

(Step S209)

Here, the document browsing unit 210 uses the viewer setting change portion 214 to perform viewer setting change process.

The document browsing unit 210 is capable of changing the position information 192 set in the viewer 97 after the browsing having been terminated. This change may be performed from the input unit 250 of the terminal 200, from the operation panel unit 6 of the image forming apparatus 1 with the terminal 200 being connected to the image forming apparatus 1, or through the recording medium 100. This allows the setting of the position information 192 of the viewer 97 to be changed for flexibly changing the position where a confidential file is to be browsed.

The document browsing unit 210 may also change the position information 192 by causing the user to make such an operation as inputting the password during the file display process. This allows the setting to be changed such that even the viewer 97 for cooperative company can make browsing at the respective bases of, for example, "headquarter", "branch A", and "branch B".

By the above way, the file browsing process according to the embodiment of the present disclosure terminated.

By configuring as above, the following advantages will be obtained.

The image forming apparatus 1 according to the embodiment of the present disclosure is an image forming apparatus featuring a file browsing control system that performs control of browsing of the browsing file 96 with the image forming apparatus 1 and the terminal 200. The image forming apparatus 1 includes the document acquisition portion 83 for acquiring the document data 95; the document encryption portion 84 for encrypting the document data 95 as the browsing file 96 with the public key 190; and the position information setting portion 86 for setting position information in the viewer 97 to permit browsing of the browsing file 96 encrypted by the document encryption portion 84 for causing the browsing file 96 to be browsed at the terminal 200, while the terminal 200 includes the storage unit 290 for storing the viewer 97 including the secret key 191 for decrypting the browsing file 96 encrypted by the document encryption portion 84, and the position information 192 set by the position information setting portion 86; the position information determination portion 212 for determining whether or not the position information 192 included in the viewer 97 stored in the storage unit 290 coincides with a current position; and the browsing execution portion 213 that, in the case where the position information determination portion 212 has determined that the position information 192 included in the viewer 97 coincides with the current position, uses the secret key 191 included in the viewer 97 stored in the storage unit 290 to decrypt the browsing file 96 for causing it to be browsed.

By thus configuring, a current position of the terminal 200 can be acquired from the GPS reception unit 240, and in the case where the current position of the terminal 200 is the location that has been previously set in the position information 192 in the viewer 97, the secret key 191 can be used to decrypt the document for making it browsable.

In other words, in the present embodiment, for the browsing file 96 saved in the terminal 200, such a position information 192 as that, for example, to permit the user to browse it in the office, but not permit the user to browse it outside of the office, can be set in the viewer 97. That is to say, it becomes possible to encrypt the document itself, limit the access thereto, and in the case where it has been determined that the user is in the office, decrypt the browsing file 96 for permitting the user to brows it. This can prevent occurrence of information leakage, and the like, resulting from the document being brought to outside of the office.

Further, the position information 192 to permit browsing of the browsing file 96, such as an internal document, saved in the terminal 200 can be changed under prescribed conditions. In other words, in the case where the position where to permit browsing is to be changed, simply by exchanging viewers 97, the encrypted browsing file 96 can be used as it is. In other words, the location where to permit browsing of a file can be simply specified and changed.

Therefore, for a browsing-restricted file, such as an internal document, there is no need for separately preparing a file with which the position information to permit browsing has been changed, every time in accordance with the user being a partner or a person of a cooperative company, or the like, whereby labor saving can be achieved.

Further, since determination of the position information is performed with the viewer 97, it is not required that the browsing location be set for each particular document data 95, and delivery or distribution thereof can be performed by causing the browsing file 96 to be downloaded from on the Internet, or the like.

Thereby, it becomes possible to easily handle the encrypted browsing file 96, whereby the convenience of the user can be improved.

Further, as in the present embodiment, by setting the position information 192 on the side of the viewer 97, it becomes possible to manage the security by means of the viewer 97. Therefore, the need for the authorized user performing detailed security settings, such as the position information 192, in the browsing file 96 is eliminated, whereby the possibility of occurrence of a wrong security setting can be lowered.

Further, even if a wrong security setting has been caused, the problem can be solved on the side of the viewer 97 by taking such a measure as updating the viewer 97.

Further, in the present embodiment, even after the browsing file 96 having been distributed, the security setting, such as the browsing location of the position information 192, can be changed.

Up to now, it has been substantially difficult to update the browsing file 96 that has been already distributed. Contrarily to this, since the viewer 97 is set in each user's terminal 200, by updating the setting of the viewer 97, or providing an expiration date, or the like, the browsing file 96 can be forcedly subjected to periodical updating. Therefore, even after the browsing file 96 having been prepared, the location where to permit browsing thereof can be easily changed.

Further, with the file browsing control system of the present embodiment, since the secret key 191 for decryption is set in the viewer 97, the browsing file 96 can be browsed even in the environment in which the terminal 200 is not connected to the network 150, whereby the convenience is enhanced.

Further, by browsing without connecting to the network 150, the possibility of being subjected to an attack through the network 150, and the like, can be minimized, whereby outflow of the key information can be suppressed. Accordingly the security can be enhanced.

Further, with the file browsing control system of the present embodiment, the browsing file 96 is encrypted with the public key 190, and by setting the secret key 191 in the viewer 97, the browsing file 96 is encrypted and decrypted with different keys in the browsing file 96 and the viewer 97.

Therefore, the risk of outflow of the secret key 191 to outside of the image forming apparatus 1 and the terminal 200 is minimized, thereby the security can be enhanced. Further, in the present embodiment, even if the browsing file 96 has been acquired, and the position information to permit browsing has been known, with them alone, the browsing file 96 cannot be decrypted, whereby the security can be enhanced.

In the present embodiment, there may be a number of authorized users, preparing the browsing file 96 from the document data 95. Further, in the present embodiment, since the public key 190 is used for encryption, even a general user can prepare the browsing file 96, thereby the convenience can be enhanced.

Further, the image forming apparatus 1 of the present disclosure includes the storage unit 9 for storing the viewer 97; the secret key setting portion 85 for setting the secret key 191 for decrypting the browsing file 96 in the viewer 97 stored in the storage unit 9; and the file viewer transmission portion 87 for transmitting, to the terminal 200, the viewer 97 in which the secret key 191 has been set by the secret key setting portion 85, and the browsing file 96.

By thus configuring, the viewer 97 itself in which the secret key 191 has been set can be transmitted to the terminal 200. Thereby, the need for delivering the secret key 191 itself from the image forming apparatus 1 to the terminal 200 is eliminated, and every time the position information 192 is set, the secret key 191 can be updated, whereby the security can be improved.

Further, the terminal 200 of the present embodiment is configured such that it will not permit browsing in the event where a current position cannot be acquired, whereby the security can be enhanced.

The terminal 200 of the present disclosure may be implemented by the driver (driver software) of the terminal, such as a PC or a smart phone, or a dedicated application (application software).

Further, the present disclosure is also applicable to information process apparatuses other than the image forming apparatus. In other words, the image forming apparatus may be configured to use a network scanner, a server to which a scanner is separately connected with a USB, or the like.

Further, a configuration that transmits the browsing file 96 to the terminal 200 without encrypting it may be provided.

The configuration and operation of the above embodiment are examples, and of course it is possible to alter them as appropriate for implementation within the scope of the gist of the present disclosure for execution.

What is claimed is:

1. A file browsing method that performs control of browsing of a file with an image forming apparatus and a terminal, the method comprising:
via the image forming apparatus,
determining whether a user of the image forming apparatus is an authorized user;
encrypting the file of the authorized user with a public key;
storing a plurality of viewers for causing the file to be browsed at the terminal, wherein:
each of the plurality of viewers includes position information to permit browsing of said encrypted file and a secret key to decrypt the encrypted file, wherein the position information is not included in the file;
the position information of each of the plurality viewers includes, in accordance with an authority of a user caused to browse at the terminal and a type of the viewer, an allowable position or an allowable position range, the plurality of viewers including i) a first viewer for a cooperative company having first position information, wherein the first position information allows the file to be browsable only from a predefined location, ii) a second viewer for a general partner having second position information, wherein the second position information allows the file to be browsable from any of a plurality of predefined locations, and iii) a third viewer for a senior management employee having third position information, wherein the third position information allows the file to be browsable from any location; and the secret keys vary for each of the plurality of viewers;

setting, in each of the plurality of viewers, the position information to permit browsing of said the encrypted file at the terminal;

setting, in each of the plurality of viewers, the secret key to decrypt the encrypted file; and transmitting to the terminal the encrypted file and the plurality of viewers; and via the terminal, receiving from the image forming apparatus the encrypted file and the plurality of viewers transmitted;

storing the encrypted file and the plurality of viewers received from the image forming apparatus;

calculating a current position of the terminal using a Global Positioning System ('GPS') reception unit comprising a receiver and an antenna;

determining whether the position information included in a viewer of the plurality of viewers received from the image forming apparatus and stored in the terminal coincides with the current position of the terminal;

reading the secret key of the viewer of the plurality of viewers received from the image forming apparatus and stored in the terminal; and decrypting the encrypted file using the secret key of the viewer of the plurality of viewers received from the image forming apparatus and stored in the terminal and causing the decrypted file to be browsed, if the position information of the viewer of the plurality of viewers received from the image forming apparatus and stored in the terminal coincides with the current position of the terminal, wherein the image forming apparatus is a multifunctional peripheral ('MFP').

2. The method of claim 1, wherein the position information included in each of the plurality of viewers received from the image forming apparatus and stored in terminal further includes at least one of a browsing time, the number of permissible times of browsing, a permissible date of browsing, and a deadline of browsing.

3. A file browsing system that performs control of browsing of a file, the system comprising:

an image forming apparatus, wherein the image forming apparatus is a multifunctional peripheral ('MFP'); and a terminal, wherein, the image forming apparatus comprises:

a first control unit formed by a central processing unit ('CPU'), wherein the first control unit formed by the CPU includes:

a user authentication portion that determines whether a user of the image forming apparatus is an authorized user; and a document encryption portion that encrypts the file of the authorized user with a public key;

a non-transitory recording medium that stores a plurality of viewers for causing the file to be browsed at the terminal, wherein:

each of the plurality of viewers includes position information to permit browsing of said encrypted file and a secret key to decrypt the encrypted file, wherein the position information is not included in the file;

the position information of each of the plurality viewers includes, in accordance with an authority of a user caused to browse at the terminal and a type of the viewer, an allowable position or an allowable position range, the plurality of viewers including i) a first viewer for a cooperative company having first position information, wherein the first position information allows the file to be browsable only from a predefined location, ii) a second viewer for a general partner having second position information, wherein the second position information allows the file to be browsable from any of a plurality of predefined locations, and iii) a third viewer for a senior management employee having third position information, wherein the third position information allows the file to be browsable from any location; and the secret keys vary for each of the plurality of viewers;

a position information setting portion comprised by the first control unit that sets in each of the plurality of viewers, the position information to permit browsing of the encrypted file at the terminal;

a secret key setting portion comprised by the first control unit that sets, in each of the plurality of viewers, the secret keys to decrypt the encrypted file;

a network connection device for connecting the image forming apparatus to a network;

a file viewer transmission portion comprised by the first control unit that uses the network connection device to transmit to the terminal the encrypted file and the plurality of viewers; and the terminal comprises:

a second control unit that executes programs using a hardware resource, wherein the second control unit includes a file viewer acquisition portion that receives from the image forming apparatus the encrypted file and the plurality of viewers;

a storage device that stores the encrypted file and the plurality of viewers received; and a Global Positioning System ('GPS') reception unit comprising a receiver and an antenna for the GPS that calculates a current position of the terminal;

wherein the second control unit further comprises a position information determination portion that acquires the current position of the terminal by the GPS reception unit, and determine whether the position information included in a viewer of the plurality of viewers received from the image forming apparatus and stored in the storage device coincides with the current position of the terminal; and wherein the second control unit further comprises a browsing execution portion that reads the secret key included in the viewer of the plurality of viewers received from the image forming apparatus and stored in the storage device, decrypts the encrypted file using the secret key included in the viewer of the plurality of viewers received from the image forming apparatus and stored in the storage device, and causes the file to be browsed, if the position information determination portion has determined that the position information included in the viewer of the plurality of viewers received from the image forming apparatus and stored in the second storage device coincides with the current position of the terminal.

4. The system of claim 3, wherein the position information included in each of the plurality of viewers stored in the non-transitory recording medium or the storage device further includes at least one of a browsing time, the number of permissible times of browsing, a permissible date of browsing, and a deadline of browsing.

5. An image forming apparatus for performing control of browsing of a file by a terminal, comprising:
- a control unit formed by a central processing unit ('CPU'), wherein the control unit formed by the CPU comprises:
  - a user authentication portion that determines whether a user of the image forming apparatus is an authorized user; and
  - a document encryption portion that encrypts said file with a public key;
- a non-transitory recording medium that stores a plurality of viewers for causing the file to be browsed at the terminal, wherein:
  - each of the plurality of viewers includes position information to permit browsing of said encrypted file and a secret key to decrypt the encrypted file, wherein the position information is not included in the file;
  - the position information of each of the plurality of viewers includes, in accordance with an authority of a user caused to browse at the terminal and a type of the viewer, an allowable position or an allowable position range, the plurality of viewers including i) a first viewer for a cooperative company having first position information, wherein the first position information allows the file to be browsable only from a predefined location, ii) a second viewer for a general partner having second position information, wherein the second position information allows the file to be browsable from any of a plurality of predefined locations, and
  - iii) a third viewer for a senior management employee having third position information, wherein the third position information allows the file to be browsable from any location; and
  - the secret key of each of the plurality of viewers varies;
- a position information setting portion comprised by the control unit that sets, in each of the plurality of viewers, the position information to permit browsing of said encrypted file at said terminal;
- a secret key setting portion comprised by the control unit that sets, in each of the plurality of viewers, the secret keys to decrypt the encrypted file;
- a network connection device for connecting the image forming apparatus to a network; and
- a file viewer transmission portion comprised by the control unit that uses the network connection device to transmit to the terminal the encrypted file and a viewer of the plurality of viewers;
- wherein the image forming apparatus is a multifunctional peripheral ('MFP').

6. The image forming apparatus of claim 5, wherein the position information further includes at least one of a browsing time, the number of permissible times of browsing, a permissible date of browsing, and a deadline of browsing.

7. The image forming apparatus of claim 5, wherein the file viewer transmission portion transmits to the terminal the plurality of viewers.

8. A terminal for browsing a file of an authorized user encrypted by an image forming apparatus, comprising:
- a control unit that executes programs using a hardware resource, wherein the control unit comprises a file viewer acquisition portion that receives from the image forming apparatus the encrypted file and a plurality of viewers;
- a storage device that stores the encrypted file and the plurality of viewers received, wherein:
  - each of the plurality of viewers includes position information to permit browsing of the file at the terminal and a secret key to decrypt the encrypted file set by the image forming apparatus, wherein the position information is not included in the file;
  - the position information of each of the plurality of viewers stored in the storage device includes, in accordance with an authority of a user caused to browse at the terminal and a type of the viewer, an allowable position or an allowable position range, the plurality of viewers including i) a first viewer for a cooperative company having first position information, wherein the first position information allows the file to be browsable only from a predefined location, ii) a second viewer for a general partner having second position information, wherein the second position information allows the file to be browsable from any of a plurality of predefined locations, and iii) a third viewer for a senior management employee having third position information, wherein the third position information allows the file to be browsable from any location; and
  - the secret keys stored in the storage device vary for each of the plurality of viewers stored in the storage device; and
- a Global Positioning System ('GPS') reception unit comprising a receiver and an antenna for the GPS that calculates a current position of the terminal;
- wherein the control unit further comprises a position information determination portion that acquires the current position of the terminal by the GPS reception unit, and determine whether the position information included in a viewer of the plurality of viewers received from the image forming apparatus and stored in the storage device coincides with the current position of the terminal,
- wherein the control unit further comprises a browsing execution portion that reads the secret key included in a viewer of the plurality of viewers received from the image forming apparatus and stored in the storage device, decrypts the encrypted file using the secret key included in a viewer of the plurality of viewers received from the image forming apparatus and stored in the storage device, and causes the decrypted file to be browsed, if the position information determination portion has determined that the position information included in the viewer and stored in the storage device coincides with the current position of the terminal, and
- wherein the image forming apparatus is a multifunctional peripheral ('MFP').

9. The terminal of claim 8, wherein the position information included in each of the plurality of viewers received from the image forming apparatus and stored in the storage device further includes at least one of a browsing time, the number of permissible times of browsing, a permissible date of browsing, and a deadline of browsing.

* * * * *